United States Patent
Kamata (10) Patent No.: US 10,341,507 B1
(45) Date of Patent: Jul. 2, 2019

(54) IDENTIFYING A FOREIGN OBJECT IN AN ELECTRONIC DOCUMENT

(71) Applicant: Konica Minolta Laboratory U.S.A., Inc., San Mateo, CA (US)

(72) Inventor: Takayuki Kamata, Superior, CO (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 0 days.

(21) Appl. No.: 15/940,007

(22) Filed: Mar. 29, 2018

(51) Int. Cl.
*H04N 1/00* (2006.01)
*G06K 9/34* (2006.01)

(52) U.S. Cl.
CPC ......... *H04N 1/00092* (2013.01); *G06K 9/344* (2013.01); *G06K 9/348* (2013.01); *H04N 1/00037* (2013.01); *H04N 1/00076* (2013.01); *H04N 1/00331* (2013.01)

(58) Field of Classification Search
CPC ........... H04N 1/00092; H04N 1/00331; H04N 1/00037; H04N 1/00076; G06K 9/348; G06K 9/344
See application file for complete search history.

(56) References Cited

U.S. PATENT DOCUMENTS

2015/0055157 A1* 2/2015 Hamano ............ H04N 1/00037
358/1.12

FOREIGN PATENT DOCUMENTS

JP 2007-159065 A 6/2007

\* cited by examiner

*Primary Examiner* — Eric A. Rust
(74) *Attorney, Agent, or Firm* — Osha Liang LLP (57) ABSTRACT

A method is provided for processing an electronic document (ED), the method includes: generating a mark-up version of the ED that includes a text attribute that covers a first area of the ED and an image attribute that covers a second area of the ED; segmenting the text attribute into lines of text and the lines of text into words separated by spaces; determining whether the second area overlaps with the first area based on at least one of the lines of texts or the words; and displaying, in response to determining that the second area overlaps with the first area, the ED on a display to notify a user that the image attribute is an overlapped objected on the ED.

20 Claims, 10 Drawing Sheets

FIG. 3A — Operation Screen 301

Lines of Text 307  ED 303  FIG. 3F  Image Attribute 311  Design Patterns 319

WARNING! Overlap object on Page 9

ED 303  Display 399  FIG. 3G  Overlap Object 305

FIG. 4

IDENTIFYING A FOREIGN OBJECT IN AN ELECTRONIC DOCUMENT

BACKGROUND

Printing methods (e.g. personal printing, commercial printing, production printing, etc.) are available to print copies of an electronic document (ED) (e.g., word processing document, spreadsheet, slide show, webpage, etc.). Often, users may forget to remove foreign objects (e.g., labels, sticky notes, a piece of tape, e.g.) from the ED prior to scanning the ED for printing. Regardless, users still wish to prevent the printing of the ED with the foreign object.

SUMMARY

In general, in one aspect, the invention relates to a method for processing an electronic document (ED). The method comprising: generating a mark-up version of the ED that comprises a text attribute that covers a first area of the ED and an image attribute that covers a second area of the ED; segmenting the text attribute into lines of text and the lines of text into words separated by spaces; determining whether the second area overlaps with the first area based on at least one of the lines of texts or the words; and displaying, in response to determining that the second area overlaps with the first area, the ED on a display to notify a user that the image attribute is an overlapped objected on the ED.

In general, in one aspect, the invention relates to a non-transitory computer readable medium (CRM) storing computer readable program code for processing an electronic document (ED) embodied therein. The computer readable program code causes a computer to: generate a mark-up version of the ED that comprises a text attribute that covers a first area of the ED and an image attribute that covers a second area of the ED; segment the text attribute into lines of text and the lines of text into words separated by spaces; determine whether the second area overlaps with the first area based on at least one of the lines of texts or the words; and display, in response to determining that the second area overlaps with the first area, the ED on a display to notify a user that the image attribute is an overlapped objected on the ED.

In general, in one aspect, the invention relates to a system for processing an electronic document (ED), the system comprising: a memory; and a computer processor connected to the memory. The computer processor: generates a mark-up version of the ED that comprises a text attribute that covers a first area of the ED and an image attribute that covers a second area of the ED; segments the text attribute into lines of text and the lines of text into words separated by spaces; determines whether the second area overlaps with the first area based on at least one of the lines of texts or the words; and displays, in response to determining that the second area overlaps with the first area, the ED on a display to notify a user that the image attribute is an overlapped objected on the ED.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method, a non-transitory computer readable medium (CRM), and a system of processing an electronic document (ED) to detect whether objects such as labels, sticky notes, pieces of tape, etc., that are not part of (i.e., do not belong in) the original ED overlap with (i.e., covers up and/or obscures) areas of content in the ED. Such objects are referred to herein as "overlapped objects." Specifically, an electronic document (ED) is obtained including one or more lines of text made up of words separated by spaces, and a mark-up version of the ED is generated by parsing the ED. The mark-up version of the ED includes text attributes that represent areas of texts in the ED and image attributes that represent images in the ED. One or more processes are executed on the mark-up version of the ED to detect whether objects that are not part of the original ED overlap with areas of content on the ED. With the objects that overlap the ED detected, hardcopies of the ED may be generated without any errors by removal of the overlapped objects prior to the start of printing.

Figure 1:
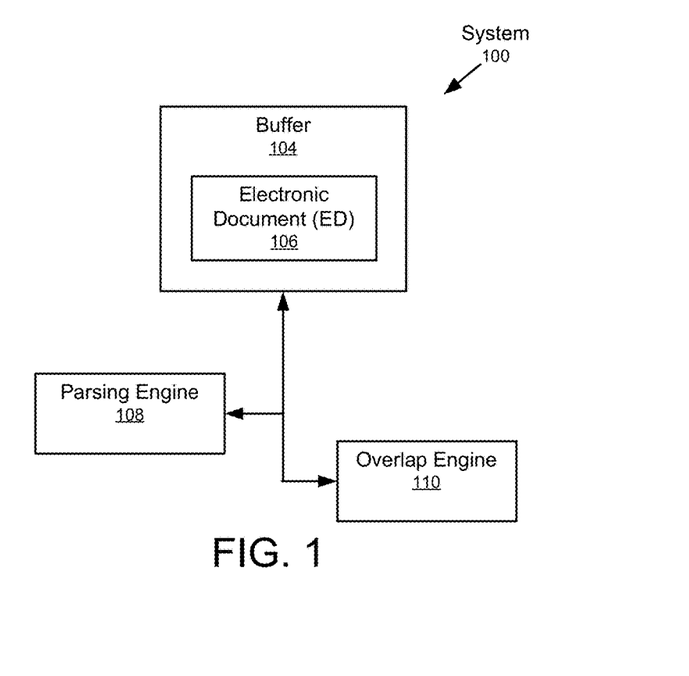
FIG. 1 shows a system in accordance with one or more embodiments of the invention.

FIG. 1 shows a system (100) in accordance with one or more embodiments of the invention. As shown in FIG. 1, the system (100) has multiple components, including, for example, a buffer (104), a parsing engine (108), and an overlapping engine (110). Each of these components (104, 108, 110) may be located on the same computing device (e.g., personal computer (PC), laptop, tablet PC, smart phone, multifunction printer, kiosk, server, etc.) or on different computing devices connected by a network of any size having wired and/or wireless segments. Each of these components is discussed below.

In one or more embodiments of the invention, the buffer (104) may be implemented in hardware (i.e., circuitry), software, or any combination thereof. The buffer (104) is configured to store an electronic document (ED) (106) including one or more lines of text made up of words. The ED (106) may also include images and graphics. The ED (106) may be obtained (e.g., downloaded, scanned, etc.) from any source. The ED (106) may be a part of a collection of EDs. Further, the ED (106) may be of any size and in any format (e.g., PDF, OOXML, ODF, HTML, etc.).

In one or more embodiments of the invention, the parsing engine (108) may be implemented in hardware (i.e., circuitry), software, or any combination thereof. The parsing engine (108) parses the ED (106) to extract content and layout information of texts and images appearing on the ED. The mark-up version of the ED (107) may be stored in the buffer (104).

In one or more embodiments of the invention, the content and layout information may include text layout attributes that represents areas of the ED that include the lines of text and image attributes that represents the images and graphics appearing on the ED. In one or more embodiments, the overlapped object is classified by the parsing engine (108) as an image attribute. This is exemplified in more detail below with reference to FIGS. 3B and 3C.

In one or more embodiments of the invention, the text attributes may include borders that define the areas within the ED that includes the lines of text. Similarly, the image attributes may include borders to define the edges of the images and graphics.

In one or more embodiments of the invention, the parsing engine (108) segments each text attribute into lines of text based on the borders of the text attribute. Each segmented line of text represents a single sentence within the ED. In one or more embodiments, the parsing engine (108) further segments each line of text into individual words separated by spaces. This is exemplified in more detail below with reference to FIGS. 3C and 3D.

In one or more embodiments of the invention, the parsing engine (108) may remove an artificial background of the ED. The artificial background of the ED may be artifacts that are generated during a scanning of the ED. For example, assume that a physical copy of the ED is a piece of plain white paper with a white background. During the scanning process, reflections in the lights of the scanner may cause the ED to be generated with a colored background (i.e., the artificial background) instead of a white background. Additionally, the reflections in the lights of the scanner may also cause the overlapped object to appear to be transparent (i.e., the original content of the ED can be partially seen through the overlapped object). This is also part of the artificial background of the ED. This is exemplified in more detail below with reference to FIG. 3F.

In one or more embodiments of the invention, the overlap engine (110) may be implemented in hardware (i.e., circuitry), software, or any combination thereof. The overlap engine (110) is configured to detect the overlapped object based on the segmented lines of text and the segmented words. In one or more embodiments, the overlap engine (110) detects whether an area of the ED defined by an image attribute overlaps with an area of the ED defined by one or more text attributes.

In one or more embodiments of the invention, the overlap engine (110) identifies the spaces between each word in a text attribute and calculates a length of each of the spaces. Alternatively, the overlap engine (110) identifies the spaces between each words based on determining the number of space characters between each word. The space characters may be included in the content information generated by the parsing engine (108). In one or more embodiments, the identification of the spaces and the calculation of the length of each space may be performed using any suitable text/image recognition, document processing, and/or image processing methods.

In one or more embodiments, the spaces may be a gap between two consecutive words within a sentence in the ED. In one or more embodiments, spaces at the beginning and end of each sentence are not considered. In one or more embodiments, an area defined by a space between two consecutive words may overlap with a portion of the area of an image attribute. This is exemplified in more detail below with reference to FIG. 3D.

In one or more embodiments of the invention, the overlap engine (110) determines whether any of the spaces within the text attribute exceeds a predetermined space threshold. The predetermined space threshold may be calculated by grouping all of the lengths of the spaces in a text attribute and determining the mode of the group of lengths (i.e., the length value that occurs the most frequently within the group). Alternatively, the predetermined space threshold may be a pre-set number of space characters determined by a user based on known information of the ED. For example, assume that the user knows that the average space characters between two consecutive words in the sentence is 1. The user may set the predetermined space threshold as 1.

The method for determining the predetermined space threshold is not limited to the examples described above. In one or more embodiments, other methods that take into account the most frequently occurring length between two consecutive words in the text attribute may be used to adjust the predetermined space threshold.

In one or more embodiments of the invention, in the event that the overlap engine (110) identifies a space exceeding the predetermined space threshold in one of the lines of text, the overlap engine (110) may determine whether spaces in the following lines of text (i.e., the lines of text below the line of text with the space that exceeds the predetermined space threshold) also include spaces that exceed the predetermined space threshold. If the overlap engine (110) determines that more than N consecutive lines of text include spaces that exceed the predetermined line threshold, the overlap engine (110) determines that an area of the ED defined by an image attribute overlaps with an area of the ED defined by one or more text attributes. In one or more embodiments, N may be any integer larger than 2. Alternatively, N may be any integer set by a user. This is exemplified in more detail below with reference to FIG. 3D.

In one or more embodiments of the invention, the overlap engine (110) identifies each border of the image attribute. The borders of the image attribute may be defined as the perimeters of the image or graphic. In one or more embodiments, the overlap engine (110) further identifies the words at the borders of the image attribute (herein referred to as "border words"). The border words may be words with one or more letters (i.e., characters) that contact one of the borders of the image attribute. In addition, the border words may be words with one or more letters that are within a predetermined distance from one of the borders of the image attribute. In other words, border words may be cut off by the image attribute. This is exemplified in more detail below with reference to FIG. 3E.

In one or more embodiments of the invention, the predetermined distance may be a distance value that is pre-set by a user. Alternatively, the predetermined distance may be calculated by the overlap engine (110) based on the content and layout information generated by the parsing engine (108).

In one or more embodiments of the invention, the identification of the borders of the image attribute and the border words may be performed using any suitable text/image recognition, document processing, and/or image processing methods. Additionally, The method for determining the predetermined space threshold is not limited to these examples. In one or more embodiments, other methods that take into account the distance between the words and the image attribute may be used to adjust the predetermined distance.

In one or more embodiments of the invention, the overlap engine (110) calculates a word recognition score for each of the border words. The word recognition score may represent how closely the identified border word can be recognized by the overlap engine (110) as a word appearing in a list of words commonly found in any suitable dictionary. The list of words may be stored in the buffer (104). For example, assume that a five-letter word at a border of the image attribute is cut off by one character and another five-letter word at the border of the image attribute is cut off by three characters. The five-letter word cut off by only a single character may have a higher recognition score than the other five-letter word that is cut off by three characters.

In one or more embodiments of the invention, the calculation of the word recognition score may be performed using any suitable text/image recognition, document processing, and/or image processing methods. Additionally, The method for calculating the word recognition score may be any suitable method that takes into account how closely an identified border word matches with a standard word from a list stored in the buffer and/or how likely the overlap engine (110) would be able to recognize the border word using any suitable text recognition method.

In one or more embodiments of the invention, the overlap engine (110) determines whether a majority (i.e., greater than 50%) of the word recognition scores is less than a predetermined recognition score threshold. Alternatively, the overlap engine (110) determines whether a predetermined percentage of the word recognition scores is less than the predetermined recognition score threshold. In one or more embodiments of the invention, the predetermined recognition score threshold may be any value that is pre-set by a user that represents a minimum score a border word may score for the overlap engine (110) to still be able to recognize the word using any suitable text recognition method. In one or more embodiments, the predetermined percentage may be any value that is pre-set by a user.

In one or more embodiments of the invention, if the overlap engine (110) determines that the majority (i.e., greater than 50%) or the predetermined percentage of the word recognition score is less than the predetermined recognition score threshold, the overlap engine (110) determines that an area of the ED defined by an image attribute overlaps with an area of the ED defined by one or more text attributes. This is exemplified in more detail below with reference to FIG. 3E.

In one or more embodiments of the invention, the overlap engine (110) identifies design patterns within the image attribute. In one or more embodiments, the design pattern may be a result of the artificial background generated by the scanning process. For example, assume that the overlapped object has become transparent (i.e., the contents of the original ED is partially visible through the overlapped object) as a result of the scanning process. The content of the original ED that is visible through the overlapped object may be detected as the design pattern.

In one or more embodiments of the invention, the overlap engine (110) determines whether any of the design patterns in the image attribute correspond to a design of the lines of text in the ED (i.e., if any of the contents of the ED that is partially visible through the overlapped object corresponds to lines of text).

In one or more embodiments of the invention, the overlap engine (110) may detect the design pattern and determine whether the design pattern correspond to the line of texts in the ED using any suitable text/image recognition, document processing, and/or image processing methods.

In one or more embodiments of the invention, if the overlap engine (110) determines that any of the design patterns in the image attribute correspond to the design of the lines of text in the ED, the overlap engine (110) determines that an area of the ED defined by an image attribute overlaps with an area of the ED defined by one or more text attributes. This is exemplified in more detail below with reference to FIG. 3F.

In one or more embodiments of the invention, when the overlap engine (110) determines that an area of the ED defined by an image attribute overlaps with an area of the ED defined by one or more text attributes, the overlap engine (110) notifies a user that an overlapped object is detected on the ED. In one or more embodiments, the overlap engine (110) may notify the user by displaying a warning on a display connected to the apparatus that is performing the printing process (e.g., a printer display screen, a computer display screen, a portable terminal/device display screen, etc.). The warning may include an image of the ED with the overlapped object. In the event that the ED is part of a collection of EDs, the warning may include information that identifies the ED among the collection of EDs. Such information may include a page of the ED, a unique identification (ID) of the ED, a number that indicates a physical location of the physical copy of the ED within a stack of physical copies of the collection of EDs, etc. This is exemplified in more detail below with reference to FIG. 3G.

In one or more embodiments of the invention, when the overlap engine (110) determines that the area of the ED defined by an image attribute does not overlap with an area of the ED defined by one or more text attributes, the overlap engine (110) sends a command to generate (i.e., print) one or more physical copies of the ED. In one or more embodiments, the overlap engine (110) instructs the parsing engine (110) to remove the artificial background before sending the command to generate (i.e., print) one or more physical copies of the ED.

Although the system (100) is shown as having three components (104, 108, 110), in other embodiments of the invention, the system (100) may have more or fewer components. Further, the functionality of each component described above may be split across components. Further still, each component (104, 108, 110) may be utilized multiple times to carry out an iterative operation.

FIGS. 2A-2D shows flowcharts in accordance with one or more embodiments of the invention. The flowcharts depict a process for detecting overlapped objects on an electronic document (ED). One or more of the steps in FIGS. 2A-2D may be performed by the components of the system (100), discussed above in reference to FIG. 1. In one or more embodiments of the invention, one or more of the steps shown in FIGS. 2A-2D may be omitted, repeated, and/or performed in a different order than the order shown in FIGS. 2A-2D. Accordingly, the scope of the invention should not be considered limited to the specific arrangement of steps shown in FIGS. 2A-2D.

Figure 2A:
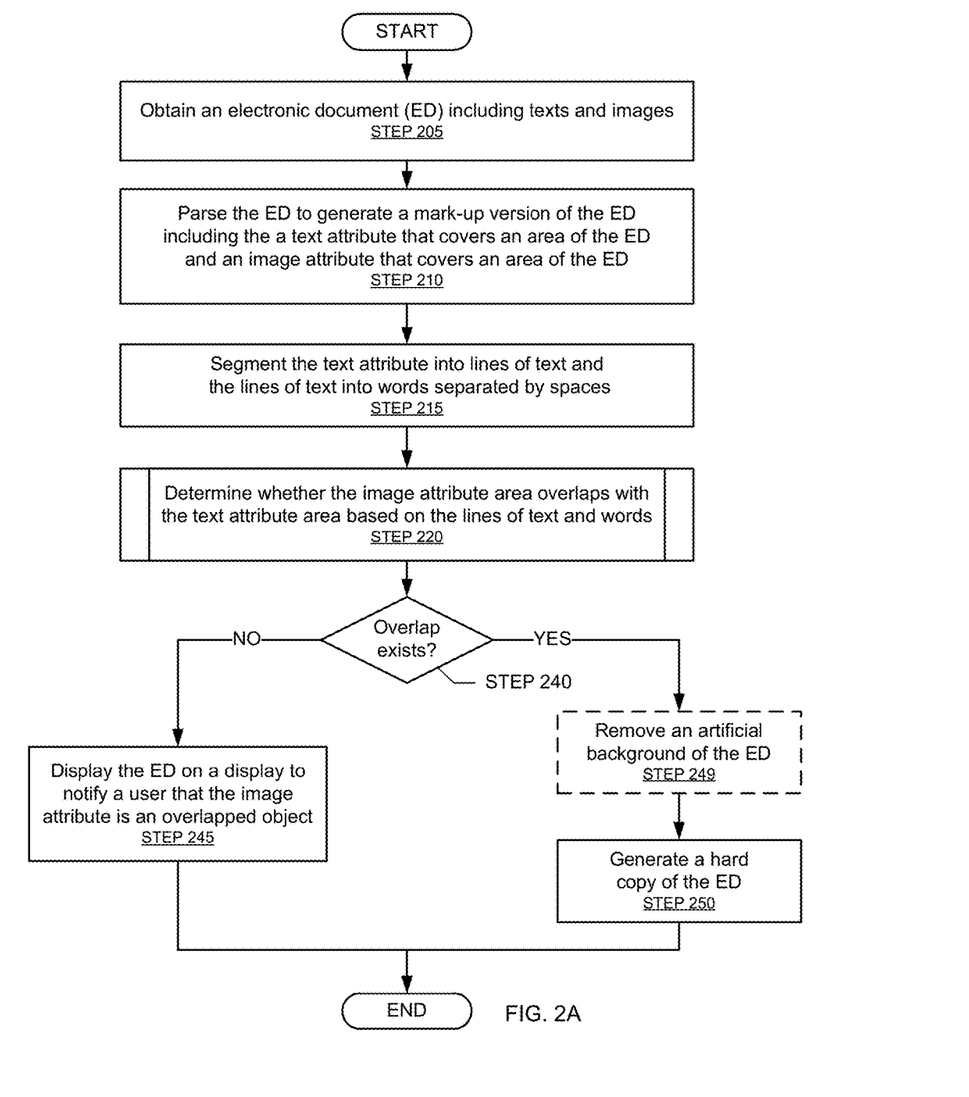
FIG. 2A shows a main flowchart in accordance with one or more embodiments of the invention.

Referring to FIG. 2A, initially, as discussed above in reference to FIG. 1, an ED is obtained including one or more lines of texts made up of words (STEP 205). The one or more lines of text form paragraphs in the ED. The ED may also include images and graphics. The ED may be obtained (e.g., downloaded, scanned, etc.) from any source. The ED may be part of a collection of EDs. Further, the ED may be of any size and in any format (e.g., PDF, OOXML, ODF, HTML, etc.).

In STEP 210, as discussed above in reference to FIG. 1, the ED is parsed to generate a mark-up version of the ED including text attributes and image attributes.

In one or more embodiments, a text attribute among the text attributes covers an area of the ED (i.e., the text attribute area), and an image attribute among the image attributes covers an area of the ED (i.e., the image attribute area). In one or more embodiments, the ED may include an artificial background.

In STEP 215, as discussed above in reference to FIG. 1, the text attributes are segmented into lines of text and the lines of text are segmented into individual words separated by spaces.

In STEPS 220 and 240, as discussed above in reference to FIG. 1, a determination is made as to whether the image attribute area overlaps with the text attribute area.

In STEP 245, as discussed above in reference to FIG. 1, if an overlap exists between the image attribute area and the text attribute area, the ED is displayed on a display and a user is notified that the image attribute is an overlapped object (i.e., that an overlapped object is detected) on the ED.

In STEP 250, as discussed above in reference to FIG. 1, if an overlap does not exist between the image attribute area and the text attribute area, a hard copy of the ED is generated (i.e., printed out). In one or more embodiments, an artificial background of the ED may be removed in STEP 249 prior to generating (i.e., printing) the hard copy of the ED.

Figure 2B:
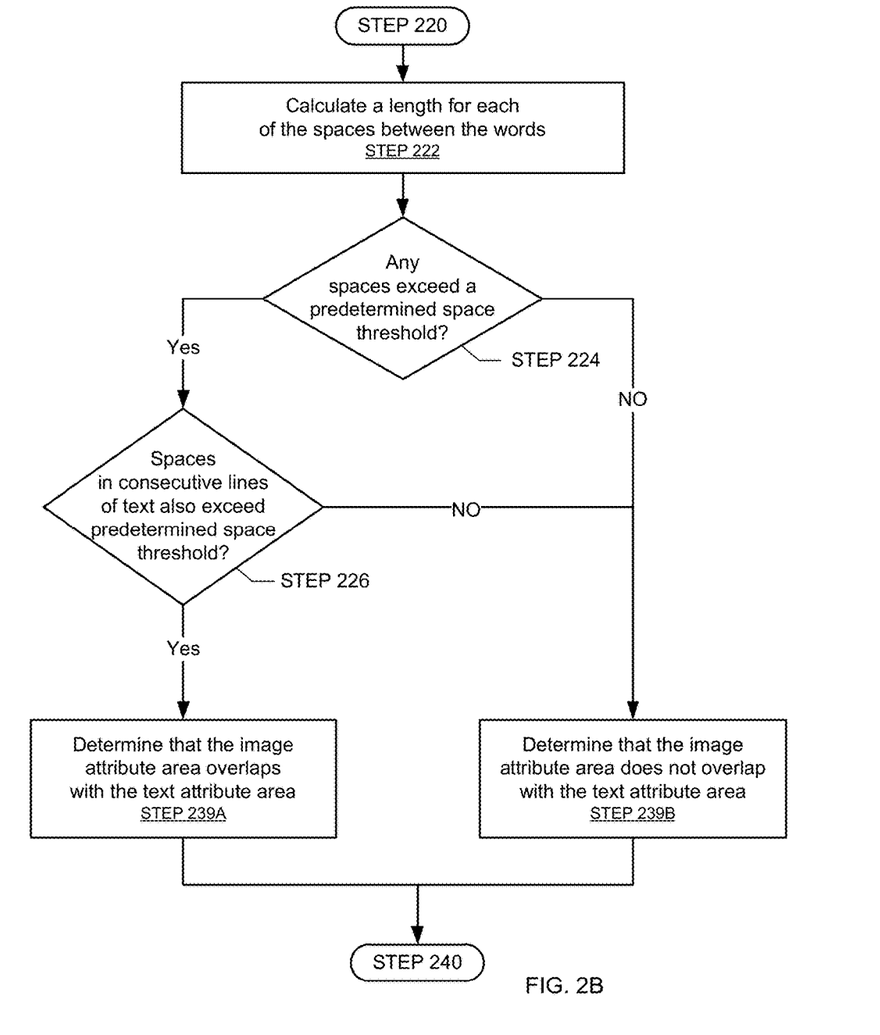
FIGS. 2B-2D show sub-flowcharts in accordance with one or more embodiments of the invention for steps in the flowchart of FIG. 2A.

FIG. 2B shows a sub-flowchart in accordance with one or more embodiments further expanding upon STEP 220 of the flow chart of FIG. 2A. The sub-flowchart in FIG. 2B depicts, at least in part, the overlap determination process based on spaces between words in the text attribute. In one or more embodiments, this process may be executed as many times as necessary to determine all overlaps that occur in the ED.

In STEP 222, as discussed above in reference to FIG. 1, a length of the spaces for each of the spaces between the words is calculated. Alternatively, a number of space characters that make up each of the spaces between the words is calculated.

In STEP 224, as discussed above in reference to FIG. 1, a determination is made as to whether any of the spaces in a line of text exceed a predetermined space threshold.

In the event that the determination is STEP 224 is YES, as discussed above in reference to FIG. 1, a determination is made as to whether any spaces in lines of text that consecutively follow the line of text (i.e., the line of text that includes the space that exceeds the predetermined space threshold) exceed the predetermined space threshold.

In the event that the determination is STEP 226 is YES, as discussed above in reference to FIG. 1, the image attribute area is determined to overlap with the text attribute area in STEP 239A.

In the event that the determination in either one of STEP 224 and STEP 226 is NO, as discussed above in reference to FIG. 1, the image attribute is determined to have no overlap with the text attribute area in STEP 239B.

Figure 2C:
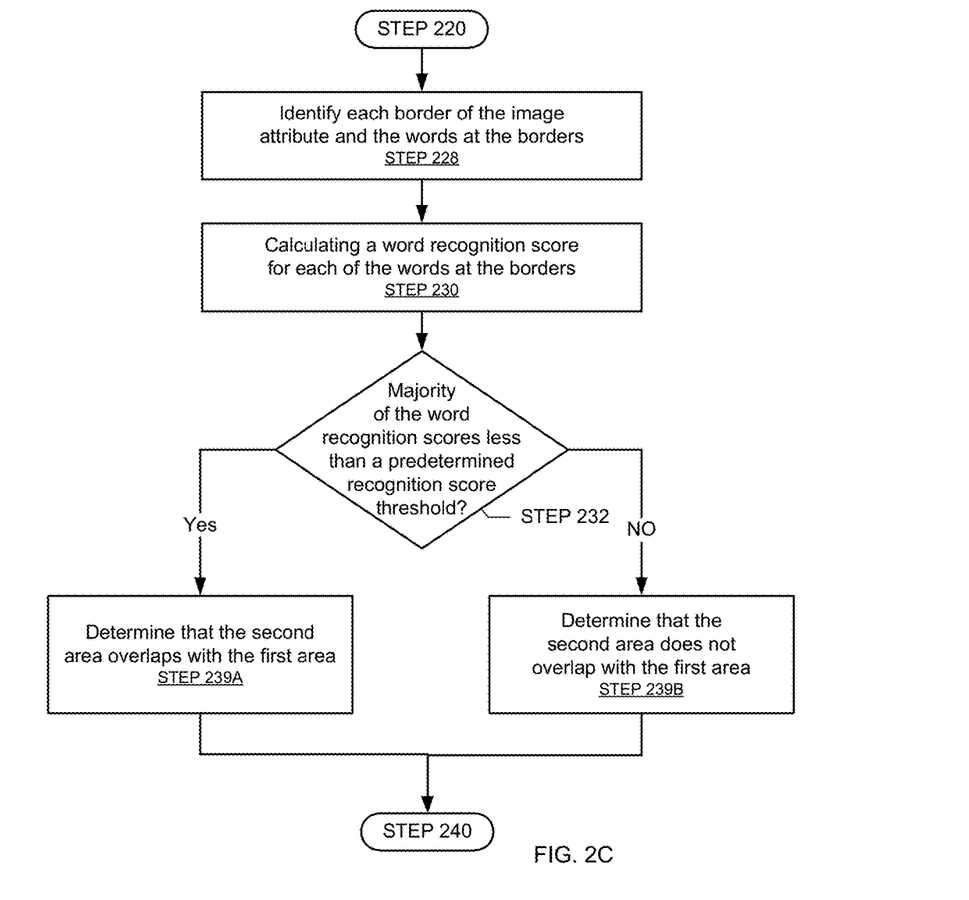

FIG. 2C shows a sub-flowchart in accordance with one or more embodiments further expanding upon STEP 220 of the flow chart of FIG. 2A. The sub-flowchart in FIG. 2C depicts, at least in part, the overlap determination process based on word recognition scores. In one or more embodiments, this process may be executed as many times as necessary to determine all overlaps that occur in the ED.

In STEP 228, as discussed above in reference to FIG. 1, each border of the image attribute and the words at the boarders (i.e., the border words) are identified.

In STEP 230, as discussed above in reference to FIG. 1, a word recognition score is calculated for each of the border words.

In STEP 232, as discussed above in reference to FIG. 1, a determination is made as to whether a majority of the word recognition scores is less than a predetermined recognition score threshold. Alternative, the determined is made to determine whether a predetermined percentage of the word recognition scores is less than the predetermined recognition score threshold.

In the event that the determination is STEP 232 is YES, as discussed above in reference to FIG. 1, the image attribute area is determined to overlap with the text attribute area in STEP 239A.

In the event that the determination is STEP 232 is NO, as discussed above in reference to FIG. 1, the image attribute is determined to have no overlap with the text attribute area in STEP 239B.

Figure 2D:
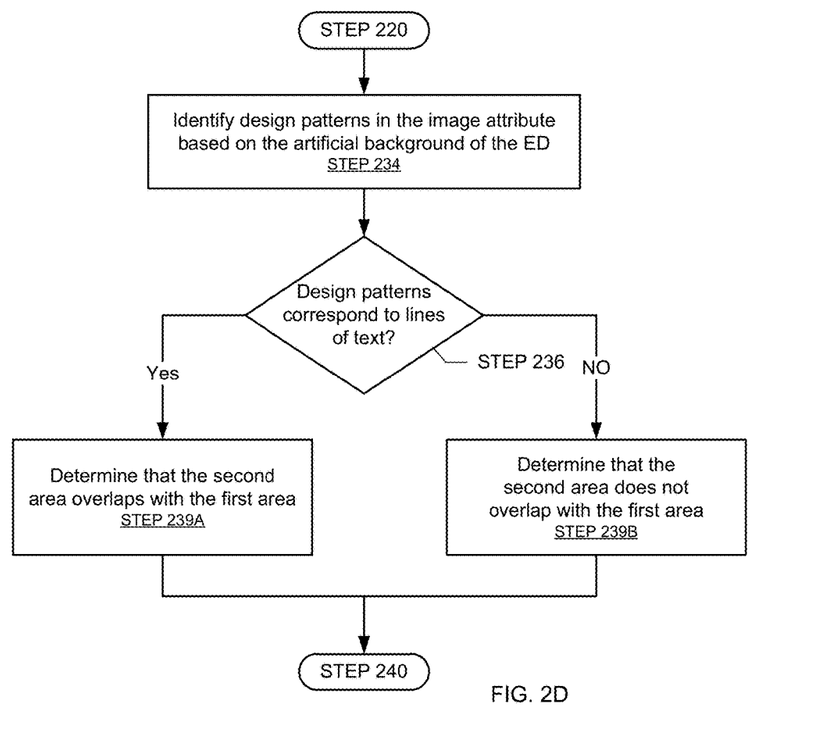

FIG. 2D shows a sub-flowchart in accordance with one or more embodiments further expanding upon STEP 220 of the flow chart of FIG. 2A. The sub-flowchart in FIG. 2C depicts, at least in part, the overlap determination process based on design pattern recognition. In one or more embodiments, this process may be executed as many times as necessary to determine all overlaps that occur in the ED.

In STEP 234, as discussed above in reference to FIG. 1, design patterns are identified in the image attribute based on the artificial background of the ED.

In STEP 236, as discussed above in reference to FIG. 1, a determination is made as to whether the identified design patterns correspond to lines of text in the ED.

In the event that the determination is STEP 236 is YES, as discussed above in reference to FIG. 1, the image attribute area is determined to overlap with the text attribute area in STEP 239A.

In the event that the determination is STEP 236 is NO, as discussed above in reference to FIG. 1, the image attribute is determined to have no overlap with the text attribute area in STEP 239B.

In one or more embodiments, the overlap determination processes discussed above in reference to FIGS. 2B-2D may be performed together in parallel based on the ED. Alternatively, only one process may be selected to be performed. In one or more embodiments, when more than one of the overlap determination processes in FIGS. 2B-2D are performed together in parallel, a determination by any of the processes that an overlapped object is detected will cause a notification to be displayed to the user.

FIGS. 3A-3G show an implementation example in accordance with one or more embodiments of the invention. In one or more embodiments, the example overlap object detection methods described above in reference to FIGS. 1 and 2A-2D are applied in the implementation example shown in FIGS. 3A-3G.

Figure 3A:
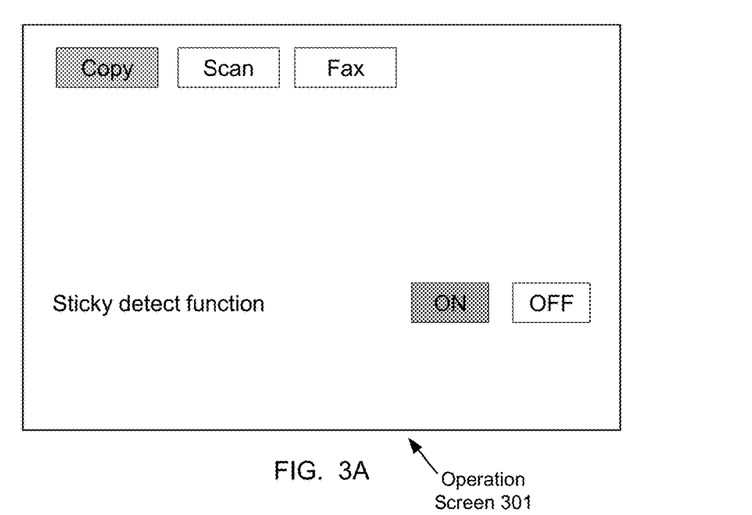
FIGS. 3A-3G show an implementation example in accordance with one or more embodiments of the invention.

FIG. 3A shows an operation screen (301) of graphical user interface GUI displayed by a display of the system (100) described above in reference to FIG. 1. As seen in FIG. 3A, an overlap detection function (e.g., the sticky detect function) may be turned ON or OFF by a user operating the system.

Figure 3B:
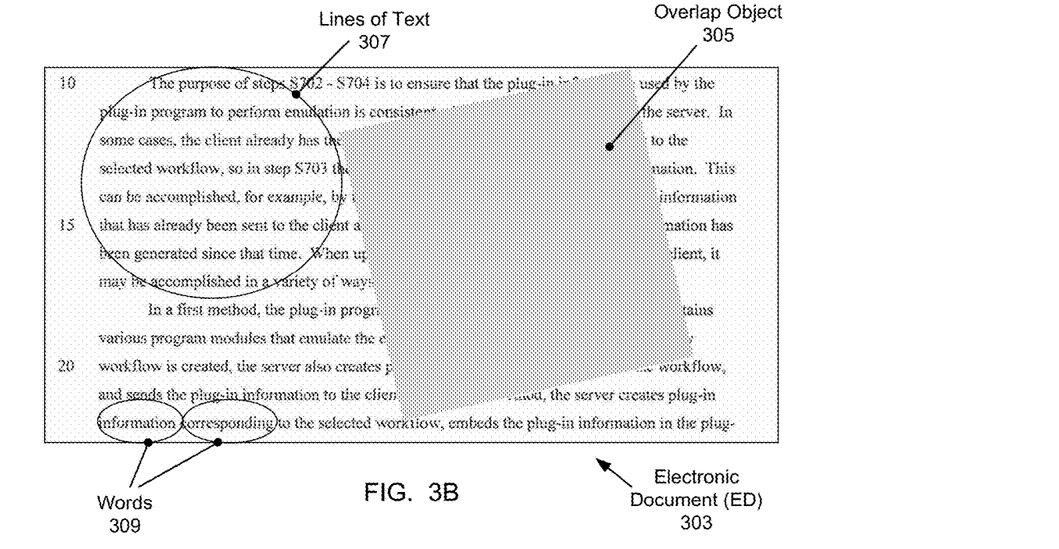

FIG. 3B shows a partial portion of an electronic document (ED) (303) that includes one or more lines of texts (307) made up of words (309). The one or more lines of texts (307) form paragraphs in the ED (303). The ED (303) may also include images and graphics (not shown). The ED (303) may be obtained (e.g., downloaded, scanned, etc.) from any source. The ED (303) may be part of a collection of EDs. Further, the ED (303) may be of any size and in any format (e.g., PDF, OOXML, ODF, HTML, etc.).

As seen in FIG. 3B, an overlap object (305) exists on the surface of the ED (303). The overlap object (305) overlaps with (i.e., covers and/or obscures) an area of the ED (303) that includes the lines of text (307). The overlap object (305) is an object that should be removed prior to the printing of the ED (303).

Figure 3C:
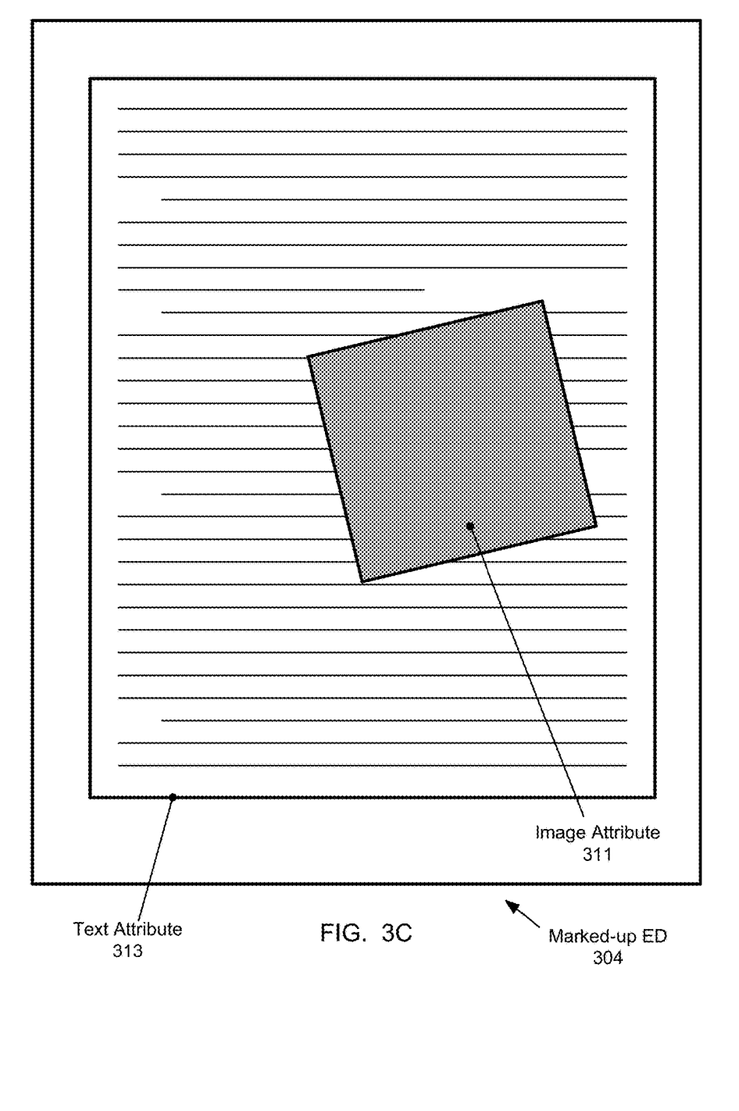

FIG. 3C shows a marked-up ED (304) that is generated after the ED (303) shown in FIG. 3B has been parsed. As seen in FIG. 3C, the marked-up ED (304) includes an image attribute (311) that corresponds to the overlap object (305) shown in FIG. 3B and a text attribute (313) that corresponds to the area that covers all of the lines of texts (307) in the ED (303).

Figure 3D:
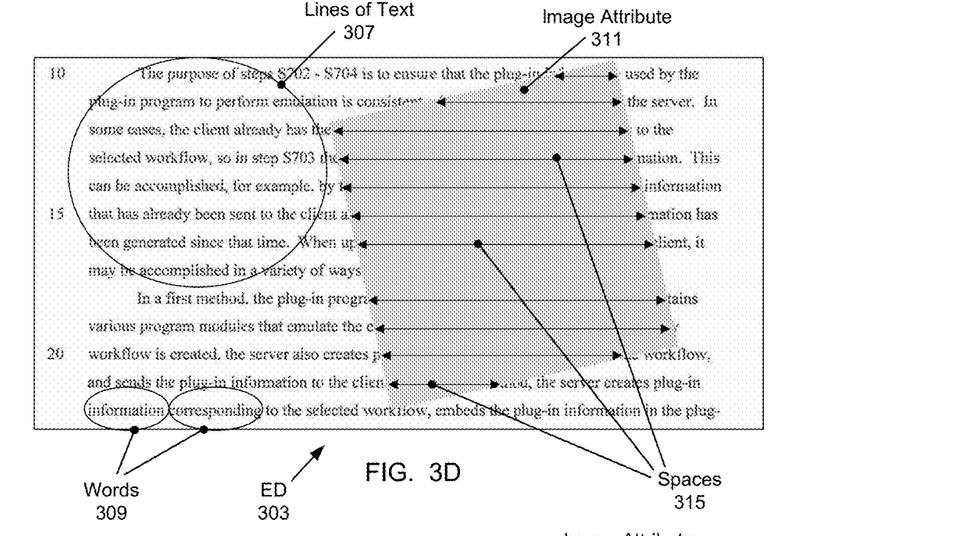

FIG. 3D shows the ED (303) discussed in FIG. 3B being processed using the overlap determination process described above in reference to FIG. 2B. As seen in FIG. 3D, one of the lines of text (307) includes a space (315) that exceeds a predetermined space threshold and lines of text (307) that consecutively-follow the line of the text (307) that includes the space (315) that exceeds a predetermined space threshold also includes spaces (315) that exceed a predetermined space threshold. In other words, as seen in FIG. 3D, all of the spaces (315) that overlap with the area of the image attribute (311) exceed the predetermined space threshold. Therefore, it is determined that the image attribute (315) is an overlapped object on the ED (303).

Figure 3E:
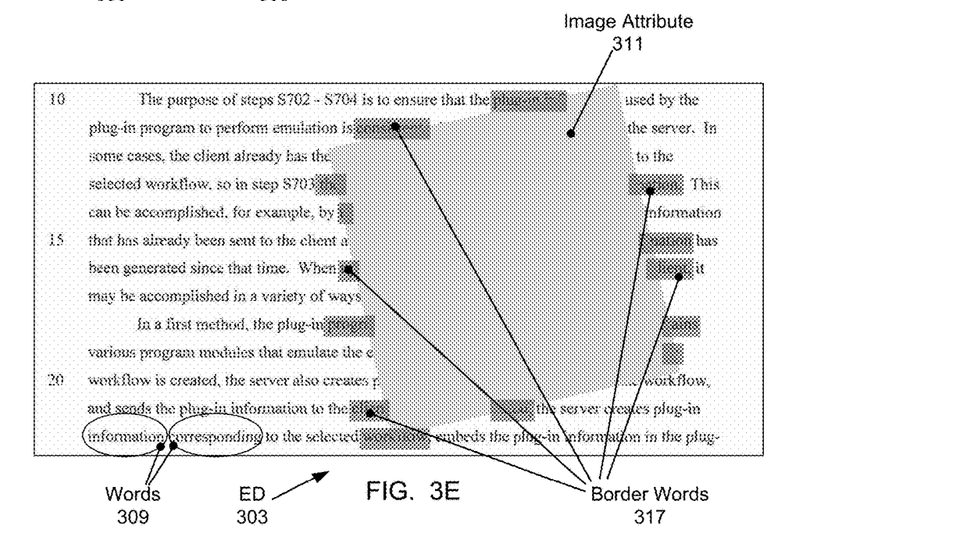

FIG. 3E shows the shows the ED (303) discussed in FIG. 3B being processed using the overlap determination process described above in reference to FIG. 2C. As seen in FIG. 3E, the border words (317) are identified. As further seen in FIG. 3E most of (i.e., a majority or a predetermined percentage of) the border words (317) are difficult to recognize (i.e., have low recognition scores compared to the other words (309) of the ED). Therefore, it is determined that the image attribute (315) is an overlapped object on the ED (303).

Figure 3F:
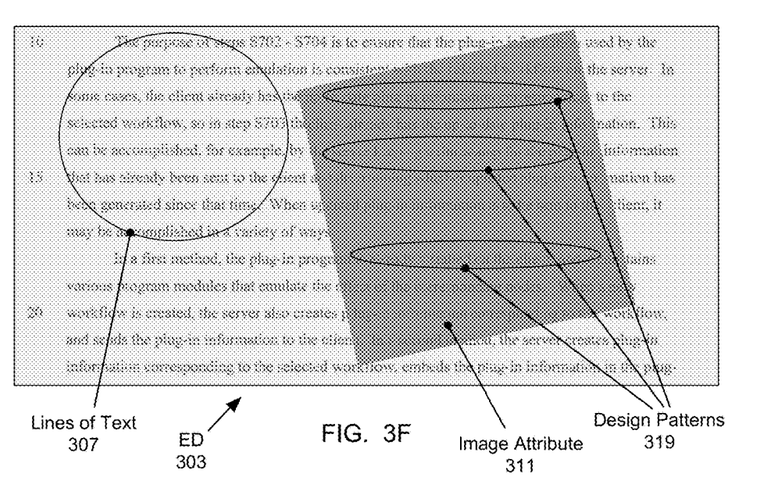

FIG. 3F shows the shows the ED (303) discussed in FIG. 3B being processed using the overlap determination process described above in reference to FIG. 2D. As seen in FIG. 3F, the ED (303) includes the artificial background (i.e., the background color of the ED is not the same as the original background color of the physical copy of the ED). As a result, the image attribute (311) becomes transparent (i.e., contents of the ED (311) are visible through the image attribute (311)).

As seen in FIG. 3F, design patterns (319) are identified within the image attribute (311). The design patterns (319) correspond to the designs of the lines of text (307). Therefore, it is determined that the image attribute (315) is an overlapped object on the ED (303).

Figure 3G:
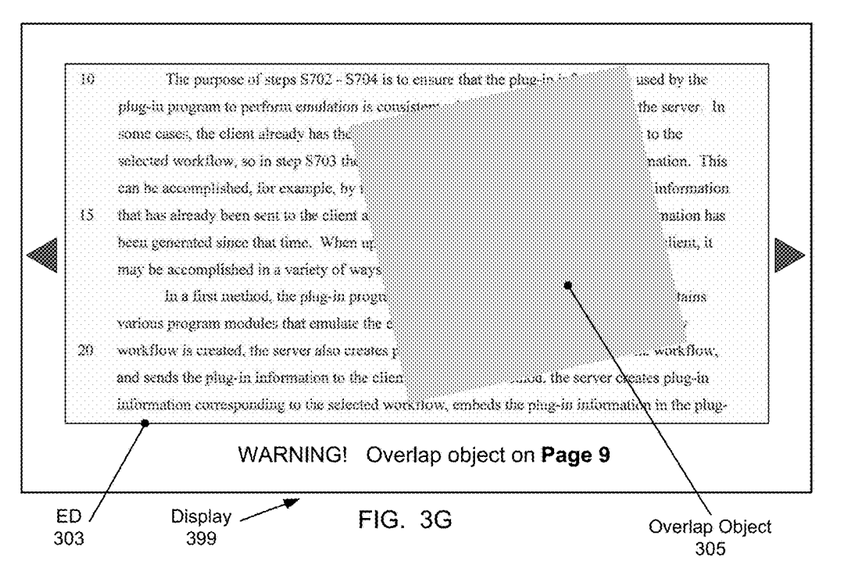

FIG. 3G shows an example of a display (399) that displays a warning notification to the user that the overlap object (305) is detected. As seen in FIG. 3G, the warning notification includes the ED (303) with the overlap object (305) and information on a page number of the ED (303). The user may then find the ED (303) based on the information and remove the overlap object (305) from the ED (303) before generating (i.e., printing) a hardcopy of the ED (303).

Figure 4:
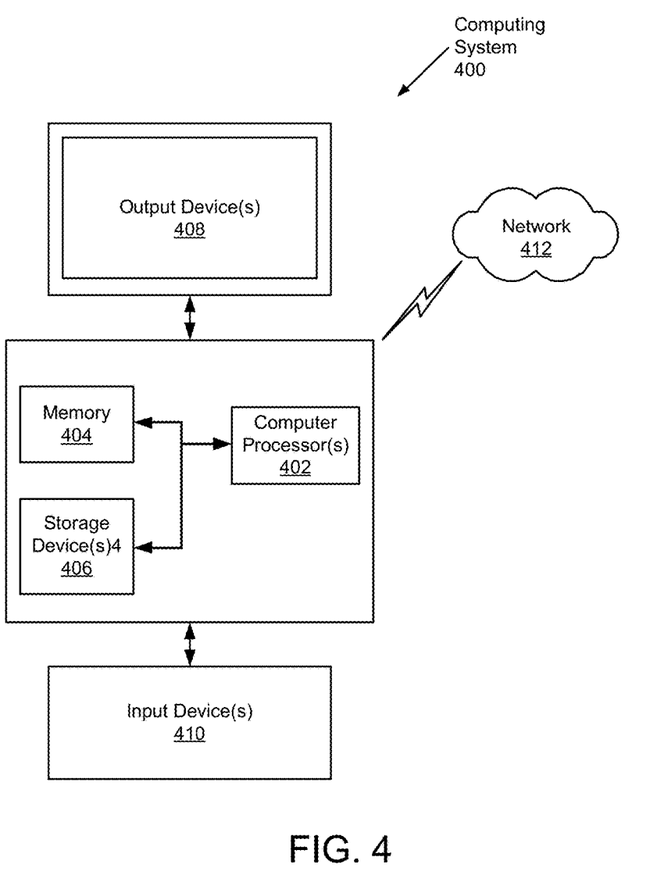
FIG. 4 shows a computing system in accordance with one or more embodiments of the invention.

Embodiments of the invention may be implemented on virtually any type of computing system, regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 4, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions. For example, the computer processor(s) may be one or more cores, or micro-cores of a processor. The computing system (400) may also include one or more input device(s) (410), such as a touchscreen, keyboard, mouse, microphone, touchpad, electronic pen, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (400) may be connected to a network (412) (e.g., a local area network (LAN), a wide area network (WAN) such as the Internet, mobile network, or any other type of network) via a network interface connection (not shown). The input and output device(s) may be locally or remotely (e.g., via the network (412)) connected to the computer processor(s) (402), memory (404), and storage device(s) (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (400) may be located at a remote location and be connected to the other elements over a network (412). Further, one or more embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

One or more embodiments of the invention may have one or more of the following advantages: the ability to increase the processing resources of central processing unit (CPU) (i.e., a processor) by preventing the unnecessary use of processing resources for the printing of electronic documents (ED) that cannot be used by a user (i.e., the EDs with overlapped objects); etc.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for processing an electronic document (ED), the method comprising:
   generating a mark-up version of the ED that comprises:
   a text attribute that covers a first area of the ED, and
   an image attribute that covers a second area of the ED;
   segmenting the text attribute into lines of text and the lines of text into words separated by spaces;
   determining whether the second area overlaps with the first area based on at least one of the lines of texts or the words; and
   displaying, in response to determining that the second area overlaps with the first area, the ED on a display to notify a user that the image attribute is an overlapped objected on the ED.

2. The method of claim 1, wherein:
   the lines include at least a first line of text, a second line of text following the first line text, and a third line of text following the second segmented line of text, and
   determining whether the second area overlaps with the first area based on at least one of the lines of texts or the words further comprises:
   calculating a length of each of the spaces between the words, and
   determining whether the length of one of the spaces in the first line of text exceeds a predetermined space threshold;
   determining whether one of the spaces in the second segmented line of text and one of the spaces in the third segmented line of text exceed the predetermined threshold; and
   determining, in response to determining that one of the spaces in the second segmented line of text and one of the spaces in the third segmented line of text exceed the predetermined threshold, that the second area overlaps the first area.

3. The method of claim 1, wherein determining whether the second area overlaps with the first area based on at least one of the lines of texts or the words further comprises:
   identifying:
   all borders of the image attribute, and
   the words at a predetermined distance from the border;
   calculating a word recognition score for each of the words at the predetermined distance from the border;
   determining whether a majority of the word recognition scores are less than a predetermined recognition score threshold; and
   determining, in response to determining that the majority of the word recognition scores are less than the predetermined recognition score threshold, that the second area overlaps the first area.

4. The method of claim 1, wherein:
   the ED is a scanned document,
   the mark-up version of the ED further comprises a background caused by the scanning of the ED,
   the background and the words of the ED are visible through the overlapped object, and
   determining whether the second area overlaps with the first area based on at least one of the lines of texts or the words further comprises:
   identifying a plurality of patterns in the image attribute;
   determining whether the patterns correspond to the lines of text; ands
   determining, in response to determining that the patterns correspond to the lines of text, that the second area overlaps the first area.

5. The method of claim 4, further comprising:
   determining that the second area is distinct from the first area based on at least one of the lines of texts or the words;
   removing, in response to the second area being distinct from the first area, the background from the mark-up version of the ED; and
   generating, after removing the background, a hardcopy of the ED.

6. The method of claim 1, wherein
   the ED is a scanned document, and
   a background of the ED caused by the scanning is removed when the mark-up version of the ED is generated.

7. The method of claim 1, further comprising:
   determining that the second area is distinct from the first area based on at least one of the lines of texts or the words; and
   generating, in response to the second are being distinct from the first area, a hardcopy of the ED.

8. The method of claim 1, wherein
   the overlapped object is a foreign object left by a user, and
   an entirety of the foreign object is disposed within a border of the ED.

9. The method of claim 8, wherein the foreign object is at least one of a sticky note, a label, or a piece of tape.

10. The method of claim 1, wherein the ED is processed by at least one of a copier, a fax machine, a scanner, or a multi-function peripheral (MFP).

11. A non-transitory computer readable medium (CRM) storing computer readable program code for processing an electronic document (ED) embodied therein, the computer readable program code causes a computer to:
    generate a mark-up version of the ED that comprises:
    a text attribute that covers a first area of the ED, and
    an image attribute that covers a second area of the ED;
    segment the text attribute into lines of text and the lines of text into words separated by spaces;
    determine whether the second area overlaps with the first area based on at least one of the lines of texts or the words; and
    display, in response to determining that the second area overlaps with the first area, the ED on a display to notify a user that the image attribute is an overlapped objected on the ED.

12. The CRM of claim 11, wherein:
    the lines include at least a first line of text, a second line of text following the first line text, and a third line following the second segmented line of text, and
    determining whether the second area overlaps with the first area based on at least one of the lines of texts or the words further comprises:
    calculating a length of each of the spaces between the words, and
    determining whether the length of one of the spaces in the first line of text exceeds a predetermined space threshold;
    determining whether one of the spaces in the second segmented line of text and one of the spaces in the third segmented line of text exceed the predetermined threshold; and determining, in response to determining that one of the spaces in the second segmented line of text and one of the spaces in the third segmented line of text exceed the predetermined threshold, that the second area overlaps the first area.

13. The CRM of claim 11, wherein determining whether the second area overlaps with the first area based on at least one of the lines of texts or the words further comprises:
identifying:
all borders of the image attribute, and
the words at a predetermined distance from the border;
calculating a word recognition score for each of the words at the predetermined distance from the border;
determining whether a majority of the word recognition scores are less than a predetermined recognition score threshold; and
determining, in response to determining that the majority of the word recognition scores are less than the predetermined recognition score threshold, that the second area overlaps the first area.

14. The CRM of claim 11, wherein:
the ED is a scanned document,
the mark-up version of the ED further comprises a background caused by the scanning of the ED,
the background and the words of the ED are visible through the overlapped object, and
determining whether the second area overlaps with the first area based on at least one of the lines of texts or the words further comprises:
identifying a plurality of patterns in the image attribute;
determining whether the patterns correspond to the lines of text; ands
determining, in response to determining that the patterns correspond to the lines of text, that the second area overlaps the first area.

15. The CRM of claim 11, wherein
the overlapped object is a foreign object left by a user, and
an entirety of the foreign object is disposed within a border of the ED.

16. A system for processing an electronic document (ED), the system comprising:
a memory; and
a computer processor connected to the memory that:
generates a mark-up version of the ED that comprises:
a text attribute that covers a first area of the ED, and
an image attribute that covers a second area of the ED;
segments the text attribute into lines of text and the lines of text into words separated by spaces;
determines whether the second area overlaps with the first area based on at least one of the lines of texts or the words; and
displays, in response to determining that the second area overlaps with the first area, the ED on a display to notify a user that the image attribute is an overlapped objected on the ED.

17. The system of claim 16, wherein:
the lines include at least a first line of text, a second line of text following the first line text, and a third line following the second segmented line of text, and
determining whether the second area overlaps with the first area based on at least one of the lines of texts or the words further comprises:
calculating a length of each of the spaces between the words, and
determining whether the length of one of the spaces in the first line of text exceeds a predetermined space threshold;
determining whether one of the spaces in the second segmented line of text and one of the spaces in the third segmented line of text exceed the predetermined threshold; and
determining, in response to determining that one of the spaces in the second segmented line of text and one of the spaces in the third segmented line of text exceed the predetermined threshold, that the second area overlaps the first area.

18. The system of claim 16, wherein determining whether the second area overlaps with the first area based on at least one of the lines of texts or the words further comprises:
identifying:
all borders of the image attribute, and
the words at a predetermined distance from the border;
calculating a word recognition score for each of the words at the predetermined distance from the border;
determining whether a majority of the word recognition scores are less than a predetermined recognition score threshold; and
determining, in response to determining that the majority of the word recognition scores are less than the predetermined recognition score threshold, that the second area overlaps the first area.

19. The system of claim 16, wherein:
the ED is a scanned document,
the mark-up version of the ED further comprises a background caused by the scanning of the ED,
the background and the words of the ED are visible through the overlapped object, and
determining whether the second area overlaps with the first area based on at least one of the lines of texts or the words further comprises:
identifying a plurality of patterns in the image attribute;
determining whether the patterns correspond to the lines of text; ands
determining, in response to determining that the patterns correspond to the lines of text, that the second area overlaps the first area.

20. The system of claim 16, wherein
the overlapped object is a foreign object left by a user, and
an entirety of the foreign object is disposed within a border of the ED.

* * * * *